(12) United States Patent
Xu et al.

(10) Patent No.: US 10,063,358 B2
(45) Date of Patent: Aug. 28, 2018

(54) PILOT SIGNAL SENDING AND RECEIVING METHOD AND APPARATUS

(71) Applicant: Huawei Technologies Co., Ltd., Shenzhen, Guangdong (CN)

(72) Inventors: Xiuqiang Xu, Shanghai (CN); Shunqing Zhang, Shenzhen (CN); Gaoning He, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 15/172,928

(22) Filed: Jun. 3, 2016

(65) Prior Publication Data

US 2016/0359601 A1 Dec. 8, 2016

Related U.S. Application Data

(63) Continuation of application No. PCT/CN2014/084632, filed on Aug. 18, 2014.

(30) Foreign Application Priority Data

Dec. 5, 2013 (CN) .......................... 2013 1 0655253

(51) Int. Cl.
  *H04L 5/00* (2006.01)
  *H04W 72/04* (2009.01)
  *H04W 84/04* (2009.01)

(52) U.S. Cl.
  CPC .......... *H04L 5/0048* (2013.01); *H04L 5/0053* (2013.01); *H04W 72/0446* (2013.01); *H04W 84/042* (2013.01)

(58) Field of Classification Search
  None
  See application file for complete search history.

(56) References Cited

U.S. PATENT DOCUMENTS

2010/0172235 A1 7/2010 Liu et al.
2011/0026637 A1 2/2011 Lee et al.
(Continued)

FOREIGN PATENT DOCUMENTS

CN 101277289 A 10/2008
CN 101707511 A 5/2010
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.9.0, Dec. 2009, 83 pages.

(Continued)

*Primary Examiner* — Candal Elpenord

(57) ABSTRACT

Embodiments of this application disclose a pilot signal sending and receiving method and apparatus, wherein the pilot signal sending method includes: establishing a first correspondence between a carrier identifier and a pilot pattern of a first type of pilot signal; establishing a second correspondence between a carrier identifier and a resource block set; acquiring a target carrier identifier of a target carrier; determining a location of a target resource block set corresponding to the target carrier identifier; determining a target pilot pattern that is of a first type of pilot signal and that corresponds to the target carrier identifier; mapping, according to the target pilot pattern, the first type of pilot signal to each resource block in the target resource block set on the target carrier. In this method, mapping is performed on a pilot signal only in a resource block set, which may reduce pilot redundancy and overheads.

16 Claims, 12 Drawing Sheets

(56) References Cited

U.S. PATENT DOCUMENTS

| | | | |
|---|---|---|---|
| 2011/0199995 A1* | 8/2011 | Ito .......................... | H04L 5/00 370/329 |
| 2012/0147831 A1* | 6/2012 | Golitschek ............ | H04L 1/0026 370/329 |
| 2012/0170458 A1 | 7/2012 | Zee et al. | |
| 2014/0023009 A1* | 1/2014 | Abe ...................... | H04W 24/10 370/329 |

FOREIGN PATENT DOCUMENTS

| | | |
|---|---|---|
| CN | 102055712 A | 5/2011 |
| CN | 102763391 A | 10/2012 |
| WO | WO 2011/120224 A1 | 10/2011 |

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.5.0, Jun. 2012, 101 pages.

"3rd Generation Partnership Project; Technical Specification Group Radio Access Network; Evolved Universal Terrestrial Radio Access (E-UTRA); Physical Channels and Modulation (Release 11)", 3GPP TS 36.211 V11.0.0, Sep. 2012, 106 pages.

\* cited by examiner

PILOT SIGNAL SENDING AND RECEIVING METHOD AND APPARATUS

CROSS REFERENCE TO RELATED APPLICATIONS

This application is a continuation of International Application No. PCT/CN2014/084632, filed on Aug. 18, 2014, which claims priority to Chinese Patent Application No. 201310655253.8, filed on Dec. 5, 2013, both of which are hereby incorporated by reference in their entireties.

TECHNICAL FIELD

This application relates to the field of communications technologies, and in particular, to a pilot signal sending and receiving method and apparatus.

BACKGROUND

In a wireless cellular network, such as a UTRAN (Universal Terrestrial Radio Access Network) and an EUTRAN (Evolved Universal Terrestrial Radio Access Network), to successfully receive a network service (such as network camping and data transmission), a terminal needs to perform a series of measurement and feedback on the network, such as measurement of carrier channel quality (such as carrier signal strength and signal quality), channel estimation (performed for data reception), and measurement and feedback of channel state information (CSI), where a physical signal on which the series of measurement and feedback, performed by the terminal, is based may be collectively referred to as a pilot signal.

In a traditional OFDM (Orthogonal Frequency Division Multiplexing) system, such as a release 8 of an LTE (Long Term Evolution) system, when mapping and sending of a transmission resource are performed on a pilot signal, full-bandwidth mapping and sending are performed on all pilot signals in a manner in which a quantity of pilots is maximized, that is, pilot signals on entire bandwidth (such as 20 MHz) are simultaneously used for channel measurement, channel estimation, and possible measurement of channel state information.

However, actually, when a terminal performs channel measurement or synchronization, pilots only on some resource blocks, not all pilots on full bandwidth in a frequency domain, are needed to meet a measurement precision requirement. In addition, on a premise of little allowed impact on performance, when demodulating data on a resource block, the terminal does not need to use a pilot signal on another resource block (such as a resource block without data) to perform channel estimation. Therefore, except the some resource blocks used for channel measurement or synchronization, when there is no data sent on other resource blocks, and the other resource blocks are not used for measuring channel state information, a pilot signal may not be sent.

Therefore, an existing manner of sending a pilot signal is likely to cause extremely large redundancy of pilot signals and lead to large pilot overheads.

SUMMARY

This application provides a pilot signal sending and receiving method and apparatus, so as to resolve a problem of redundancy of pilot signals in the prior art.

To solve the foregoing technical problem, embodiments of this application disclose the following technical solutions:

According to a first aspect, an embodiment of this application provides a pilot signal sending method, including: establishing a first correspondence between a carrier identifier and a pilot pattern of a first type of pilot signal, where the first type of pilot signal is used to control a terminal to perform channel measurement, and pilot patterns that are of the first type of pilot signal and that are corresponding to different carrier identifiers are orthogonal; establishing a second correspondence between a carrier identifier and a resource block set allocated in a carrier to the carrier identifier, where the resource block set includes multiple resource blocks that are continuous both in a time domain and in a frequency domain; acquiring a target carrier identifier of a target carrier; determining, according to the second correspondence, a location of a target resource block set corresponding to the target carrier identifier; determining, according to the first correspondence, a target pilot pattern that is of a first type of pilot signal and that is corresponding to the target carrier identifier; mapping, according to the target pilot pattern, the first type of pilot signal corresponding to the target carrier identifier to each resource block in the target resource block set on the target carrier; sending the first correspondence and the second correspondence to the terminal; and sending, to the terminal, the target carrier to which the first type of pilot signal is mapped.

With reference to the first aspect, in a first possible implementation manner of the first aspect, the establishing a first correspondence between a carrier identifier and a pilot pattern of a first type of pilot signal includes: acquiring multiple types of pilot patterns that are of the first type of pilot signal and that are on a resource block, where the multiple types of pilot patterns are orthogonal in a pairwise manner; performing numbering on the multiple types of pilot patterns, where different pilot patterns have different numbers; converting the carrier identifier into a decimal number, and dividing the decimal number by a quantity of the multiple types of pilot patterns corresponding to the first type of pilot signal, so as to obtain a remainder; and selecting, as the pilot pattern corresponding to the carrier identifier, a pilot pattern whose number is equal to the remainder.

With reference to the first possible implementation manner of the first aspect, in a second possible implementation manner of the first aspect, the establishing a second correspondence between a carrier identifier and a resource block set allocated in a carrier to the carrier identifier includes: dividing all resource blocks in the carrier into multiple resource block sets; performing numbering on the multiple resource block sets, where different resource block sets have different numbers; converting the carrier identifier into a decimal number, and dividing the decimal number by a quantity of the resource block sets obtained by means of division, so as to obtain a remainder; and selecting, as the resource block set corresponding to the carrier identifier, a resource block set whose number is equal to the remainder.

With reference to the first possible implementation manner of the first aspect, in a third possible implementation manner of the first aspect, the sending the first correspondence and the second correspondence to the terminal includes: generating radio resource control signaling that includes the first correspondence and the second correspondence; and sending the radio resource control signaling to the terminal; and/or generating a second carrier that includes the first correspondence and the second correspondence and that is adjacent to the target carrier; and sending the second carrier to the terminal.

With reference to the first aspect, the first possible implementation manner of the first aspect, the second possible implementation manner of the first aspect, or the third possible implementation manner of the first aspect, in a fourth possible implementation manner of the first aspect, the method further includes: selecting a resource block as a to-be-processed block from the target resource block set; determining whether a pilot signal of another type corresponding to the target carrier identifier is sent on the to-be-processed block, where the pilot signal of another type includes one or a combination of a second type of pilot signal, a third type of pilot signal, and a fourth type of pilot signal, the second type of pilot signal is used to control the terminal to perform channel estimation, the third type of pilot signal is used to control the terminal to perform channel state measurement and feedback, and the fourth type of pilot signal is used to control the terminal to perform location measurement; when the pilot signal of another type is sent on the to-be-processed block, acquiring a pilot pattern of the pilot signal of another type according to a preset third correspondence between the pilot signal of another type and a pilot pattern; mapping the pilot signal of another type to the to-be-processed block according to the pilot pattern of the pilot signal of another type; determining whether a resource block that is not selected as a to-be-processed block exists in all resource blocks in the target resource block set; and when the resource block that is not selected as a to-be-processed block exists, using the unselected resource block as a next to-be-processed resource block, and determining whether a pilot signal of another type corresponding to the target carrier identifier is sent on the next to-be-processed block, until no resource block that is not selected as a to-be-processed block exists in the target resource block set.

According to a second aspect, an embodiment of this application further provides a pilot signal receiving method, including: receiving a target carrier; extracting a target carrier identifier from the target carrier; acquiring a first correspondence between the target carrier identifier and a pilot pattern of a first type of pilot signal and a second correspondence between the target carrier identifier and a resource block set, where the first type of pilot signal is used to control a terminal to perform channel measurement, and the resource block set includes multiple resource blocks that are continuous both in a time domain and in a frequency domain; determining, according to the second correspondence, a location of a target resource block set corresponding to the target carrier identifier; determining, according to the first correspondence, a target pilot pattern that is of a first type of pilot signal and that is corresponding to the target carrier identifier; and extracting, according to the target pilot pattern, the first type of pilot signal corresponding to the target carrier identifier from multiple resource blocks in the target resource block set on the target carrier.

With reference to the second aspect, in a first possible implementation manner of the second aspect, the acquiring a first correspondence between the target carrier identifier and a pilot pattern of a first type of pilot signal and a second correspondence between the target carrier identifier and a resource block set includes: receiving radio resource control signaling, or receiving a second carrier adjacent to the target carrier, where the radio resource control signaling and the second carrier each carry the first correspondence between the target carrier identifier and the pilot pattern of the first type of pilot signal and the second correspondence between the target carrier identifier and the resource block set; and extracting the first correspondence and the second correspondence from the radio resource control signaling or the second carrier.

With reference to the second aspect or the first possible implementation manner of the second aspect, in a second possible implementation manner of the second aspect, the method further includes: selecting a resource block as a to-be-processed block from the target resource block set; determining whether the to-be-processed block includes a pilot signal of another type corresponding to the target carrier identifier, where the pilot signal of another type includes one or a combination of a second type of pilot signal, a third type of pilot signal, and a fourth type of pilot signal, the second type of pilot signal is used to control the terminal to perform channel estimation, the third type of pilot signal is used to control the terminal to perform channel state measurement and feedback, and the fourth type of pilot signal is used to control the terminal to perform location measurement; when the to-be-processed block includes the pilot signal of another type, acquiring a pilot pattern of the pilot signal of another type according to a preset third correspondence between the pilot signal of another type and a pilot pattern; extracting the pilot signal of another type from the to-be-processed block according to the pilot pattern of the pilot signal of another type; determining whether a resource block that is not selected as a to-be-processed block exists in all resource blocks in the target resource block set; and when the resource block that is not selected as a to-be-processed block exists, using the unselected resource block as a next to-be-processed resource block, and determining whether a pilot signal of another type corresponding to the target carrier identifier is sent on the next to-be-processed block, until no resource block that is not selected as a to-be-processed block exists in the target resource block set.

According to a third aspect, an embodiment of this application further provides a pilot signal sending apparatus, comprising a processor and a transmitter, wherein the processor is configured to: establish a first correspondence between a carrier identifier and a pilot pattern of a first type of pilot signal, where the first type of pilot signal is used to control a terminal to perform channel measurement; establish a second correspondence between a carrier identifier and a resource block set allocated in a carrier to the carrier identifier, where the resource block set includes multiple resource blocks that are continuous both in a time domain and in a frequency domain; acquire a target carrier identifier of a target carrier; determine, according to the second correspondence, a location of a target resource block set corresponding to the target carrier identifier; determine, according to the first correspondence, a target pilot pattern that is of a first type of pilot signal and that is corresponding to the target carrier identifier; map, according to the target pilot pattern, the first type of pilot signal corresponding to the target carrier identifier to each resource block in the target resource block set on the target carrier; wherein the transmitter is configured to: send the first correspondence and the second correspondence to the terminal; and send, to the terminal, the target carrier to which the first type of pilot signal is mapped.

With reference to the third aspect, in a first possible implementation manner of the third aspect, the processor is configured to: acquire multiple types of pilot patterns that are of the pilot signal and that are on a resource block, where the multiple types of pilot patterns are orthogonal in a pairwise manner; perform numbering on the multiple types of pilot patterns, where different pilot patterns have different numbers; convert the carrier identifier into a decimal number, and divide the decimal number by a quantity of the multiple types of pilot patterns corresponding to the first type of pilot signal, so as to obtain a remainder; and select, as the pilot pattern corresponding to the carrier identifier, a pilot pattern whose number is equal to the remainder.

With reference to the third aspect, in a second possible implementation manner of the third aspect, the processor is configured to: divide all resource blocks in the carrier into multiple resource block sets; perform numbering on the multiple resource block sets, where different resource block sets have different numbers; convert the carrier identifier into a decimal number, and divide the decimal number by a quantity of the resource block sets obtained by means of division, so as to obtain a remainder; and select, as the resource block set corresponding to the carrier identifier, a resource block set whose number is equal to the remainder.

With reference to the third aspect, in a third possible implementation manner of the third aspect, the processor is configured to: generate radio resource control signaling that includes the first correspondence and the second correspondence; send the radio resource control signaling to the terminal; or generate a second carrier that includes the first correspondence and the second correspondence and that is adjacent to the target carrier; and send the second carrier to the terminal.

With reference to the third aspect, the first possible implementation manner of the third aspect, the second possible implementation manner of the third aspect, or the third possible implementation manner of the third aspect, in a fourth possible implementation manner of the third aspect, the processor is configured to: select a resource block as a to-be-processed block from the target resource block set; determine whether a pilot signal of another type corresponding to the target carrier identifier is sent on the to-be-processed block, where the pilot signal of another type includes one or a combination of a second type of pilot signal, a third type of pilot signal, and a fourth type of pilot signal, the second type of pilot signal is used to control the terminal to perform channel estimation, the third type of pilot signal is used to control the terminal to perform channel state measurement and feedback, and the fourth type of pilot signal is used to control the terminal to perform location measurement; when the pilot signal of another type is sent on the to-be-processed block, acquire a pilot pattern of the pilot signal of another type according to a preset third correspondence between the pilot signal of another type and a pilot pattern; map the pilot signal of another type to the first to-be-processed block according to the pilot pattern of the pilot signal of another type; and determine whether a resource block that is not selected as a to-be-processed block exists in all resource blocks in the target resource block set; and when the resource block that is not selected as a to-be-processed block exists, use the unselected resource block as a next to-be-processed resource block, and determine whether a pilot signal of another type corresponding to the target carrier identifier is sent on the next to-be-processed block, until no resource block that is not selected as a to-be-processed block exits in the target resource block set.

According to a fourth aspect, an embodiment of this application further provides a pilot signal receiving apparatus, comprising a receiver and a processor, wherein the receiver is configured to: receive a target carrier; the processor is configured to: extract a target carrier identifier from the target carrier; acquire a first correspondence between the target carrier identifier and a pilot pattern of a first type of pilot signal and a second correspondence between the target carrier identifier and a resource block set, where the first type of pilot signal is used to control a terminal to perform channel measurement, and the resource block set includes multiple resource blocks that are continuous both in a time domain and in a frequency domain; determine, according to the second correspondence, a location of a target resource block set corresponding to the target carrier identifier; determine, according to the first correspondence, a target pilot pattern that is of a first type of pilot signal and that is corresponding to the target carrier identifier; extract, according to the target pilot pattern, the first type of pilot signal corresponding to the target carrier identifier from multiple resource blocks in the target resource block set on the target carrier.

With reference to the fourth aspect, in a first possible implementation manner of the fourth aspect, the receiver is configured to: receive radio resource control signaling, or receive a second carrier adjacent to the target carrier, where the radio resource control signaling and the second carrier each carry the first correspondence between the target carrier identifier and the pilot pattern of the first type of pilot signal and the second correspondence between the target carrier identifier and the resource block set; and the processor is configured to: extract the first correspondence and the second correspondence from the radio resource control signaling or the second carrier.

With reference to the fourth aspect or the first possible implementation manner of the fourth aspect, in a second possible implementation manner of the fourth aspect, the processor is configured to: select a resource block as a to-be-processed block from the target resource block set; determine whether the to-be-processed block includes a pilot signal of another type corresponding to the target carrier identifier, where the pilot signal of another type includes one or a combination of a second type of pilot signal, a third type of pilot signal, and a fourth type of pilot signal, the second type of pilot signal is used to control the terminal to perform channel estimation, the third type of pilot signal is used to control the terminal to perform channel state measurement and feedback, and the fourth type of pilot signal is used to control the terminal to perform location measurement; when the to-be-processed block includes the pilot signal of another type, acquire a pilot pattern of the pilot signal of another type according to a preset third correspondence between the pilot signal of another type and a pilot pattern; extract the pilot signal of another type from the to-be-processed block according to the pilot pattern of the pilot signal of another type; determine whether a resource block that is not selected as a to-be-processed block exists in all resource blocks in the target resource block set; and when the resource block that is not selected as a to-be-processed block exists, use the unselected resource block as a next to-be-processed resource block, determine whether a pilot signal of another type corresponding to the target carrier identifier is sent on the next to-be-processed block, until no resource block that is not selected as a to-be-processed block exists in the target resource block set.

In comparison with the prior art, in this method, mapping a first type of pilot signal used to control a terminal to perform channel measurement can be performed only in a resource block set, corresponding to a carrier identifier, on a carrier, and no longer performed in a full-bandwidth scope. Therefore, in this method, total density and a total quantity of pilots may be reduced, so as to reduce pilot redundancy and overheads.

BRIEF DESCRIPTION OF THE DRAWINGS

To describe the technical solutions in the embodiments of this application more clearly, the following briefly describes the accompanying drawings required for describing the embodiments or the prior art. Apparently, persons of ordinary skill in the art may still derive other drawings from these accompanying drawings without creative efforts.

DETAILED DESCRIPTION

To make persons skilled in the art understand the technical solutions in embodiments of this application better, and make the objectives, features, and advantages of the embodiments of this application clearer, the following further describes the technical solutions in the embodiments of this application in detail with reference to the accompanying drawings.

Figure 1:
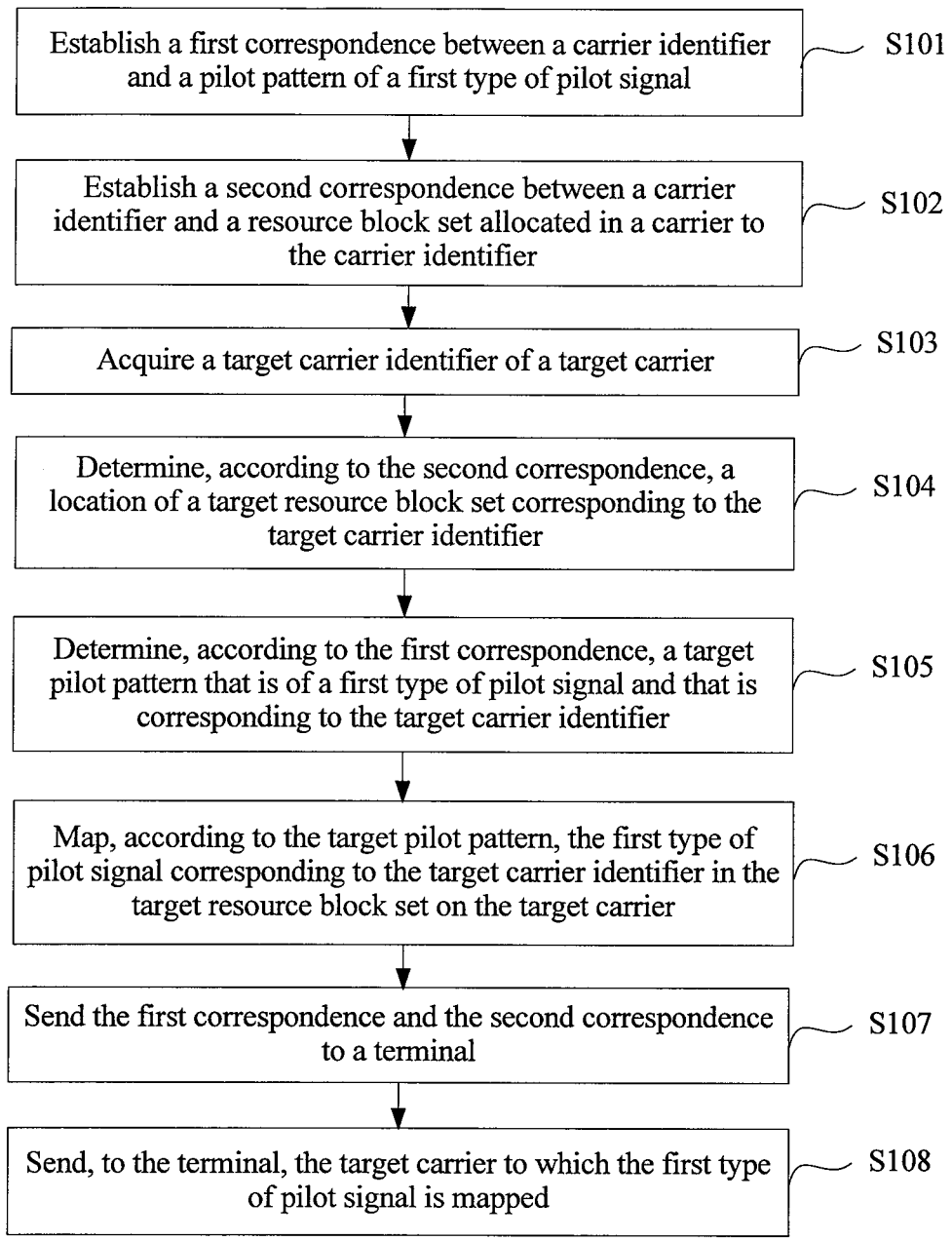
FIG. 1 is a schematic flowchart of a pilot signal sending method according to an embodiment of this application.

FIG. 1 is a schematic flowchart of a pilot signal sending method according to an embodiment of this application. As shown in FIG. 1, the method may include the following steps:

S101: Establish a first correspondence between a carrier identifier and a pilot pattern of a first type of pilot signal.

The first type of pilot signal refers to a pilot signal used to control a terminal to perform channel measurement. The terminal may perform measurement on service quality of a carrier based on the first type of pilot signal, for example, reference signal received power (RSRP) and reference signal received quality (RSRQ) in an LTE system. In another embodiment of this application, the first type of pilot signal may further be used to assist in implementing synchronization between the terminal and a network, for example, time-frequency synchronization.

In this embodiment of this application, pilot patterns that are of the first type of pilot signal and that are corresponding to different carrier identifiers are orthogonal. In this way, the first type of pilot signal on multiple adjacent carriers do not occupy a same time-frequency resource location.

Figure 2:
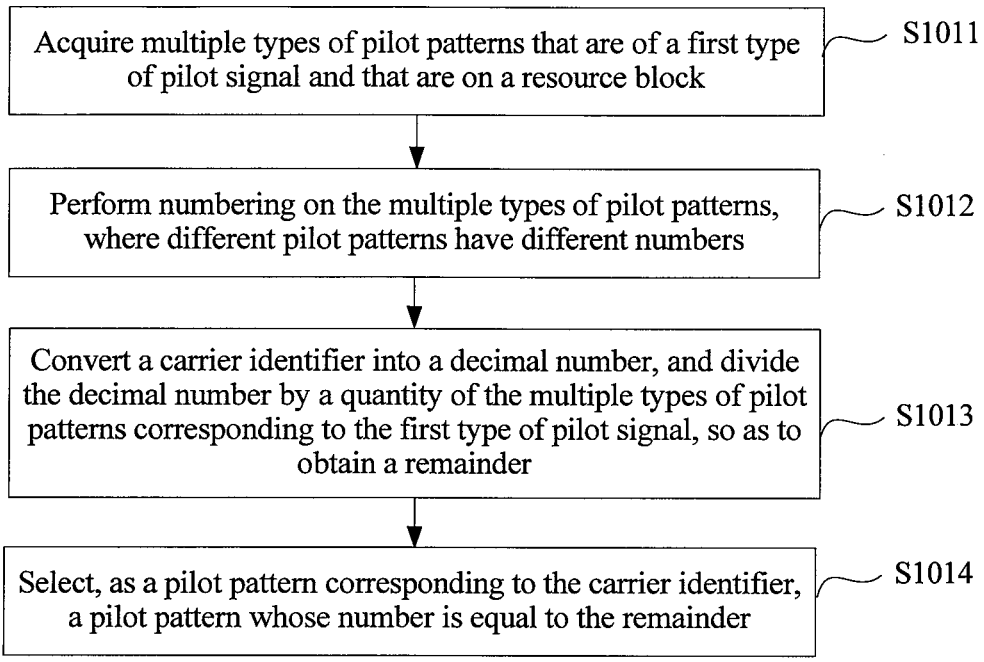
FIG. 2 is a detailed schematic flowchart of S101 according to an embodiment of this application.

As shown in FIG. 2, step S101 may be implemented in the following manner:

S1011: Acquire multiple types of pilot patterns that are of the first type of pilot signal and that are on a resource block.

The multiple types of pilot patterns that are of the first type of pilot signal and that are on the resource block may be pre-designed, and the multiple types of pilot patterns are orthogonal in a pairwise manner.

S1012: Perform numbering on the multiple types of pilot patterns, where different pilot patterns have different numbers.

S1013: Convert the carrier identifier into a decimal number, and divide the decimal number by a quantity of the multiple types of pilot patterns corresponding to the first type of pilot signal, so as to obtain a remainder.

To ensure that a pilot pattern of a first type of pilot signal corresponding to each carrier identifier is as unique as possible, in this embodiment of this application, the carrier identifier is converted into the decimal number, then dividing the decimal number by the quantity of all the pilot patterns is calculated, and the finally obtained remainder may differentiate the carrier identifier to some extent.

S1014: Select, as the pilot pattern corresponding to the carrier identifier, a pilot pattern whose number is equal to the remainder.

The foregoing embodiment shown in FIG. 2 is merely a manner of establishing a correspondence between a carrier identifier and a first type of pilot pattern according to this embodiment of this application. Alternatively, in another embodiment of this application, the first correspondence may be established in a manner of random selection or another manner, and details are not described herein again.

S102: Establish a second correspondence between a carrier identifier and a resource block set allocated in a carrier to the carrier identifier.

Figure 3:
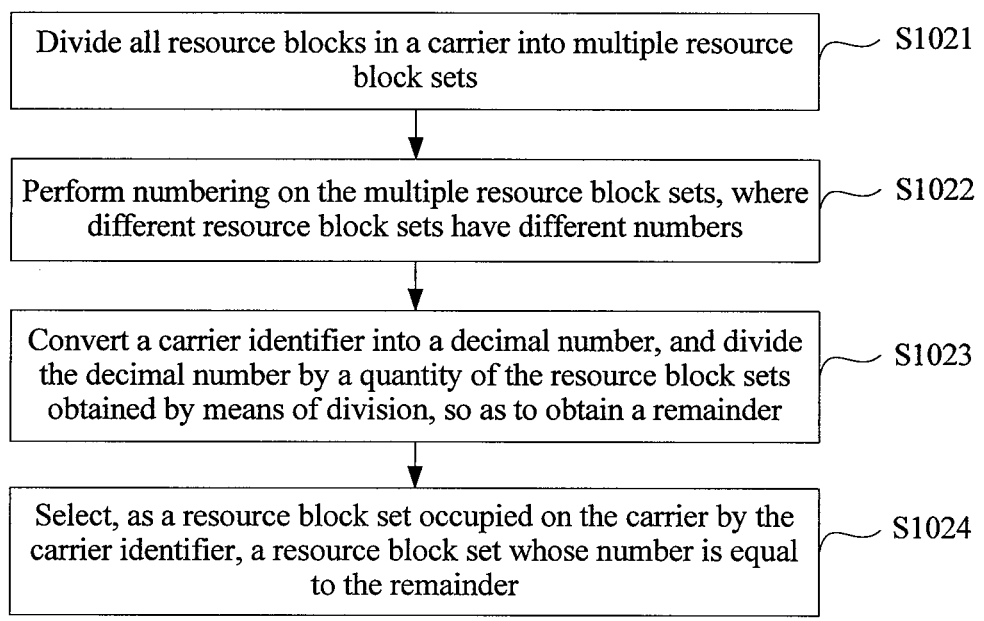
FIG. 3 is a detailed schematic flowchart of S102 according to an embodiment of this application.

The resource block set includes multiple resource blocks that are continuous both in a time domain and in a frequency domain. As shown in FIG. 3, step S102 may be implemented in the following manner:

S1021: Divide all resource blocks in the carrier into multiple resource block sets.

S1022: Perform numbering on the multiple resource block sets, where different resource block sets have different numbers.

Figure 4:
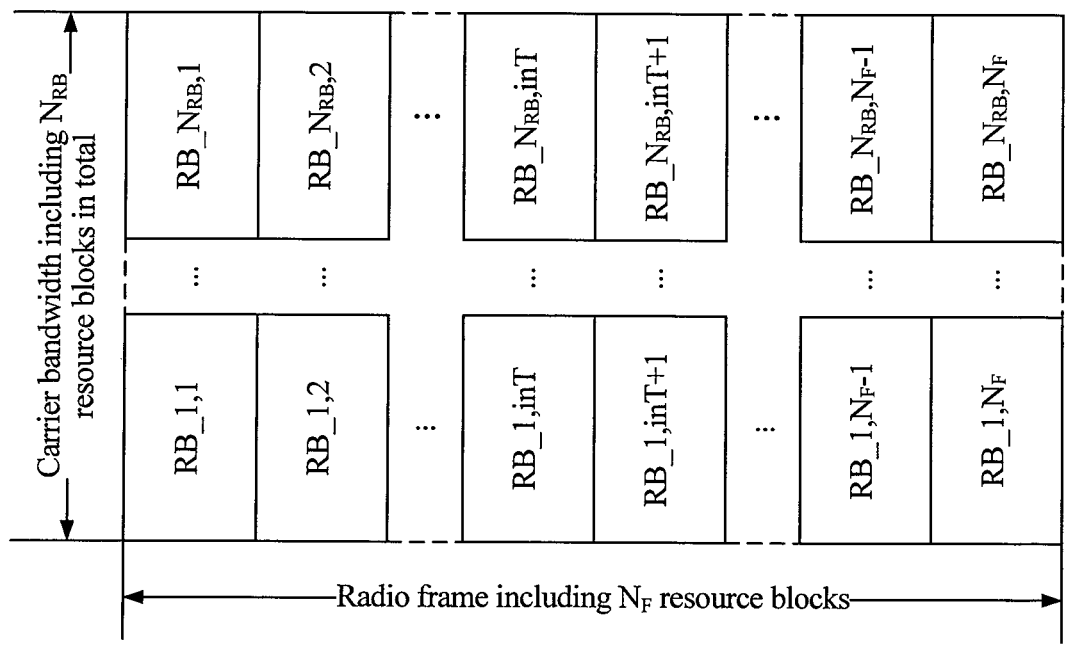
FIG. 4 is a schematic structural diagram of a radio frame according to an embodiment of this application.

When the resource blocks are divided into the resource block sets, two-dimensional numbering in a time domain and a frequency domain may be performed on all the resource blocks in the carrier, so that each resource block is represented by a unique pair of two-dimensional subscripts. As shown in FIG. 4, in the figure, numbering from 1 to NF consecutively is performed on NF (NF≥1) resource blocks included in one radio frame in a time domain; numbering from 1 to NRB consecutively is performed on NRB resource blocks in full bandwidth of a carrier in a frequency domain. In this way, each resource block of the carrier may be uniquely marked by subscripts of two dimensions of a time domain and a frequency domain. As shown in FIG. 4, a set Sk (k=1, 2, . . . , NS, NS≥1) is used as a set of NP (1≤NP≤NRB*NF) resource blocks in total NRB*NF resource blocks in each radio frame, and a method for using the Sk may ensure that resource blocks included in different resource block sets obtained by means of division have different two-dimensional subscripts, that is, each resource block set obtained by means of division is unique.

S1023: Convert the carrier identifier into a decimal number, and divide the decimal number by a quantity of the resource block sets obtained by means of division, so as to obtain a remainder.

S1024: Select, as the resource block set corresponding to the carrier identifier, a resource block set whose number is equal to the remainder.

The foregoing embodiment shown in FIG. 3 is merely a manner of establishing a correspondence between a carrier identifier and a resource block set according to this embodiment of this application. Alternatively, in another embodiment of this application, the second correspondence may be established in a manner of random selection or another manner, and details are not described herein again.

S103: Acquire a target carrier identifier of a target carrier.

S104: Determine, according to the second correspondence, a location of a target resource block set corresponding to the target carrier identifier.

S105: Determine, according to the first correspondence, a target pilot pattern that is of a first type of pilot signal and that is corresponding to the target carrier identifier.

S106: Map, according to the target pilot pattern, the first type of pilot signal corresponding to the target carrier identifier in the target resource block set on the target carrier.

S107: Send the first correspondence and the second correspondence to a terminal.

Figure 5:
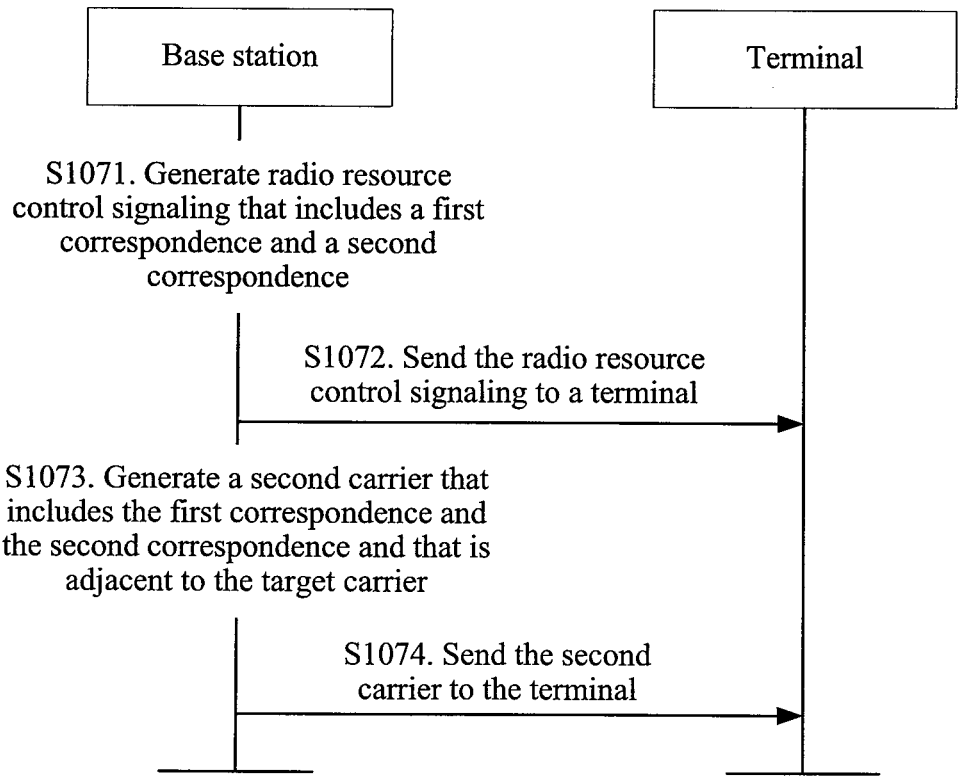
FIG. 5 is a detailed schematic flowchart of S107 according to an embodiment of this application.

In this embodiment of this application, as shown in FIG. 5, step 107 may include the following steps:

S1071: Generate radio resource control signaling that includes the first correspondence and the second correspondence.

S1072: Send the radio resource control signaling to the terminal.

In addition, as shown in FIG. 5, this step may further include the following steps:

S1073: Generate a second carrier that includes the first correspondence and the second correspondence and that is adjacent to the target carrier.

S1074: Send the second carrier to the terminal.

In another embodiment of this application, either steps S1071-S1072 or steps S1073-S1074 may be selected to transmit the first correspondence and the second correspondence, or steps S1071-S1072 and steps S1073-S1074 may be executed simultaneously. Whichever manner intends to notify, in advance, the terminal of a location, in the target carrier, of the pilot pattern that is of the first type of pilot signal and that is corresponding to the target carrier identifier, and a location of a first type of pilot pattern, that is, the location of the resource block set corresponding to the target carrier identifier.

S108: Send, to the terminal, the target carrier to which the first type of pilot signal is mapped.

According to the method provided in this embodiment of this application, a first correspondence between a carrier identifier and a pilot pattern of a first type of pilot signal that is used to control a terminal to perform channel measurement is pre-established, and in addition, a second correspondence between a carrier identifier and a resource block set is also limited, so that when a target carrier is sent, it may be uniquely determined, according to a target carrier identifier, a pilot pattern that is of a first type of pilot signal and that is corresponding to the target carrier identifier and a location, on the target carrier, of a resource block set to which the first type of pilot signal is mapped.

Figure 6:
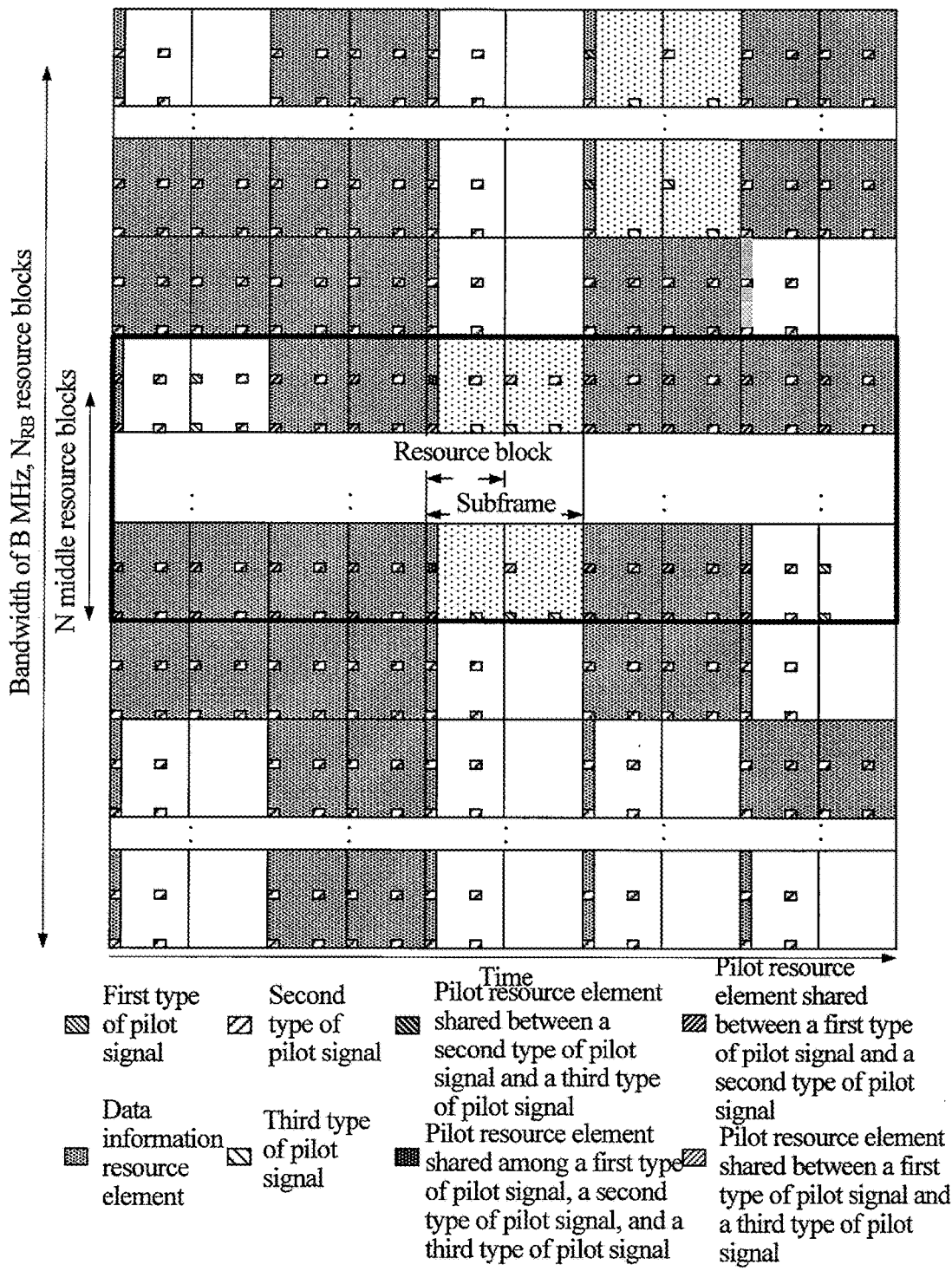
FIG. 6 is a schematic structural diagram of a carrier according to an embodiment of this application.

As shown in FIG. 6, a pilot pattern of a first type of pilot signal may be mapped to N middle resource blocks in a frequency domain of a carrier. In this embodiment of this application, N may be six, and the terminal is required to perform channel measurement and synchronization only based on a pilot signal in this area. In addition, the terminal may be required not to use a pilot signal on another resource block to perform channel estimation. In this way, a channel measurement pilot signal and a channel estimation pilot signal may not be placed on a resource block that is without data and that is not used for channel measurement.

In comparison with the prior art, in this method, mapping a first type of pilot signal used to control a terminal to perform channel measurement can be performed only in a limited area on a carrier, and no longer performed in a full-bandwidth scope. Therefore, in this method, total density and a total quantity of pilots may be reduced, so as to reduce pilot redundancy and overheads.

Figure 7:
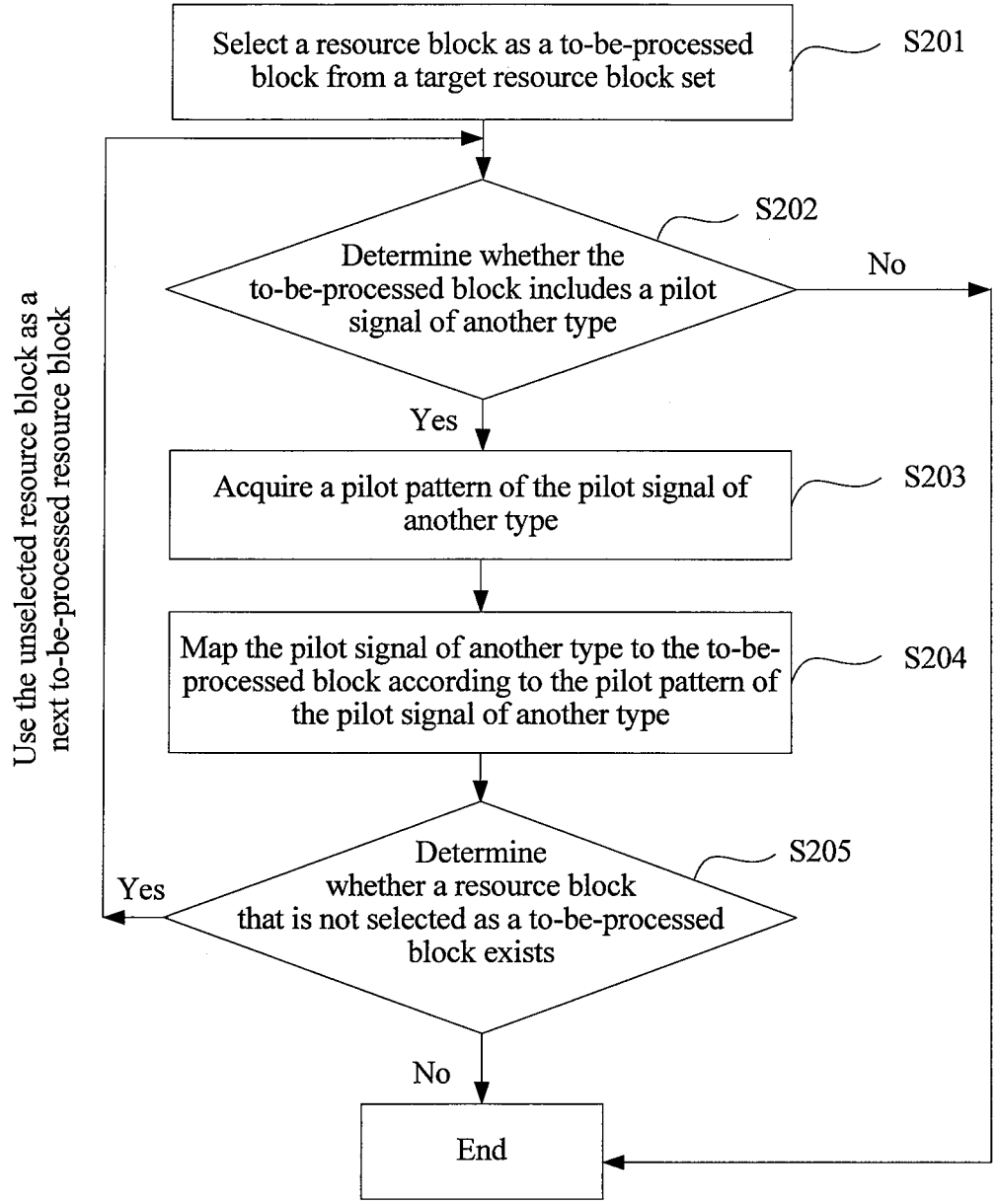
FIG. 7 is a schematic flowchart of another pilot signal sending method according to an embodiment of this application.

FIG. 7 is a schematic flowchart of another pilot signal sending method according to an embodiment of this application.

Based on the embodiment shown in FIG. 1, the method may further include the following steps:

S201: Select a resource block as a to-be-processed block from the target resource block set.

When the to-be-processed block is being selected, a resource block may be randomly selected from the target resource block set. Optionally, in this embodiment of this application, numbering may further be performed on resource blocks in the target resource block set, and then, resource blocks may be selected successively according to numbers.

S202: Determine whether the to-be-processed block includes a pilot signal of another type corresponding to the target carrier identifier; when the pilot signal of another type is included, perform S203. Otherwise, the procedure ends.

In this embodiment of this application, the pilot signal of another type includes one or a combination of a second type of pilot signal, a third type of pilot signal, and a fourth type of pilot signal. The second type of pilot signal is used to control the terminal to perform channel estimation, and the terminal may demodulate and receive user data based on the second type of pilot signal. The third type of pilot signal is used to control the terminal to perform channel state measurement and feedback, and the terminal may perform channel information measurement and feedback on the target carrier based on this type of pilot signal, such as measurement and feedback of a channel quality indicator (CQI), measurement and feedback of a rank indicator (RI), and measurement and feedback of a precoding matrix indicator in an LTE system, so that a network side selects an appropriate resource allocation policy and an appropriate code modulation manner for the terminal, and the terminal may perform channel information measurement and feedback on the target carrier based on this type of pilot signal, so that the network side selects the appropriate resource allocation policy and the appropriate code modulation manner for the terminal. The fourth type of pilot signal is used to control the terminal to perform location measurement, for example, implementing a locating function.

In this embodiment of this application, the pilot signal of another type is a pilot signal on which the terminal and a cell agree, that is, a pilot pattern corresponding to the pilot signal of another type and a location of an occupied resource block are prestored by both the terminal and the cell.

S203: Acquire a pilot pattern of the pilot signal of another type.

Because the cell and the terminal has agreed on a pilot pattern of a second pilot signal and a location of an occupied resource block, in this embodiment of this application, a correspondence between the pilot signal of another type and the pilot pattern is used as a third correspondence, and is prestored. Therefore, the pilot pattern of the pilot signal of another type may be acquired according to the third correspondence.

S204: Map the pilot signal of another type to the to-be-processed block according to the pilot pattern of the pilot signal of another type.

S205: Determine whether a resource block that is not selected as a to-be-processed block exists in all resource blocks in the target resource block set.

When the resource block that is not selected as a to-be-processed block exists, use the unselected resource block as a next to-be-processed resource block, and go back to S202. Otherwise, the procedure ends.

In comparison with the previous embodiment, when a pilot signal of another type needs to be sent on a carrier, a first type of pilot signal and a pilot signal of another type may further be simultaneously mapped to a resource block in a target resource block set, so as to share a resource block. As shown in FIG. 6, pilot signals of different types coincide on a resource block located in the middle of a carrier in the figure. Therefore, according to the method provided in this embodiment of this application, mapping pilot signals of different types to a same resource block may further reduce total density and a total quantity of pilots.

In practical application, if manners of processing pilot signals of different types at a physical layer are different, where for example, some pilot signals are involved in precoding while some pilot signals are not involved in precoding, it is generally required to design that locations of two types of pilot signals with different processing manners are not allowed to coincide on a resource block.

Figure 8:
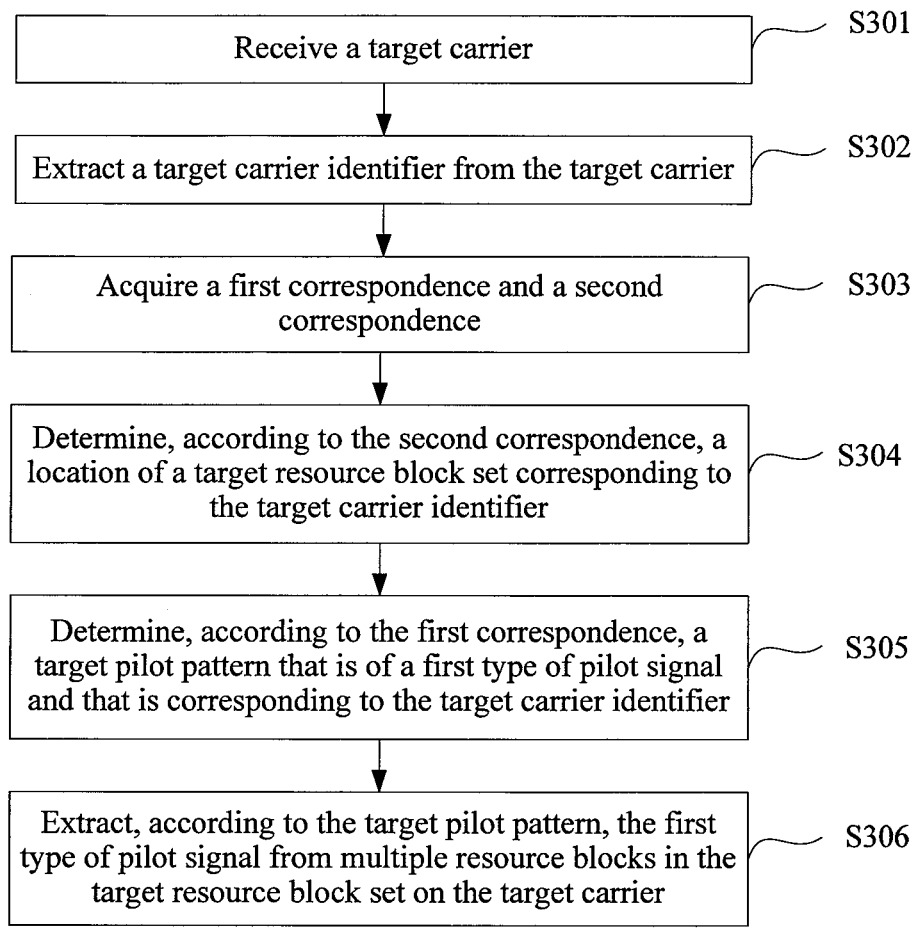
FIG. 8 is a schematic flowchart of a pilot signal receiving method according to an embodiment of this application.

FIG. 8 is a schematic flowchart of a pilot signal receiving method according to an embodiment of this application.

As shown in FIG. 8, the method may include the following steps.

S301: Receive a target carrier.

S302: Extract a target carrier identifier from the target carrier.

S303: Acquire a first correspondence between the target carrier identifier and a pilot pattern of a first type of pilot signal and a second correspondence between the target carrier identifier and a resource block set.

The first type of pilot signal is a pilot signal used to control a terminal to perform channel measurement, and the resource block set includes multiple resource blocks that are continuous both in a time domain and in a frequency domain.

Figure 9:
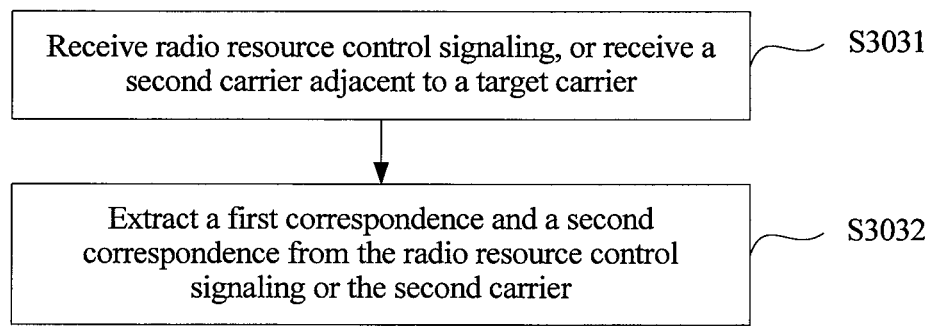
FIG. 9 is a detailed schematic flowchart of S503 according to an embodiment of this application.

In this embodiment of this application, as shown in FIG. 9, step S303 may include the following steps:

S3031: Receive radio resource control signaling, or receive a second carrier adjacent to the target carrier.

The radio resource control signaling and the second carrier each carry the first correspondence between the target carrier identifier and the pilot pattern of the first type of pilot signal and the second correspondence between the target carrier identifier and the resource block set.

S3032: Extract the first correspondence and the second correspondence from the radio resource control signaling or the second carrier.

S304: Determine, according to the second correspondence, a location of a target resource block set corresponding to the target carrier identifier.

With reference to the foregoing embodiment shown in FIG. 3, the embodiment is a process of establishing a second correspondence between a carrier identifier and a resource block set, and a location of a target resource block set corresponding to a target carrier identifier may be uniquely determined on a carrier according to the second correspondence.

S305: Determine, according to the first correspondence, a target pilot pattern that is of a first type of pilot signal and that is corresponding to the target carrier identifier.

S306: Extract, according to the target pilot pattern, the first type of pilot signal corresponding to the target carrier identifier from multiple resource blocks in the target resource block set on the target carrier.

As shown in FIG. 6, for a cell, a pilot pattern of a first type of pilot signal may be mapped to six middle resource blocks in a frequency domain of a carrier, and further, a terminal may perform channel measurement and synchronization only based on a pilot signal in this area. In comparison with the prior art, in this method, extracting a first type of pilot signal used to control a terminal to perform channel measurement can be performed only in a limited area on a carrier. Therefore, in this method, total density and a total quantity of pilots may be reduced, so as to reduce pilot redundancy and overheads.

Figure 10:
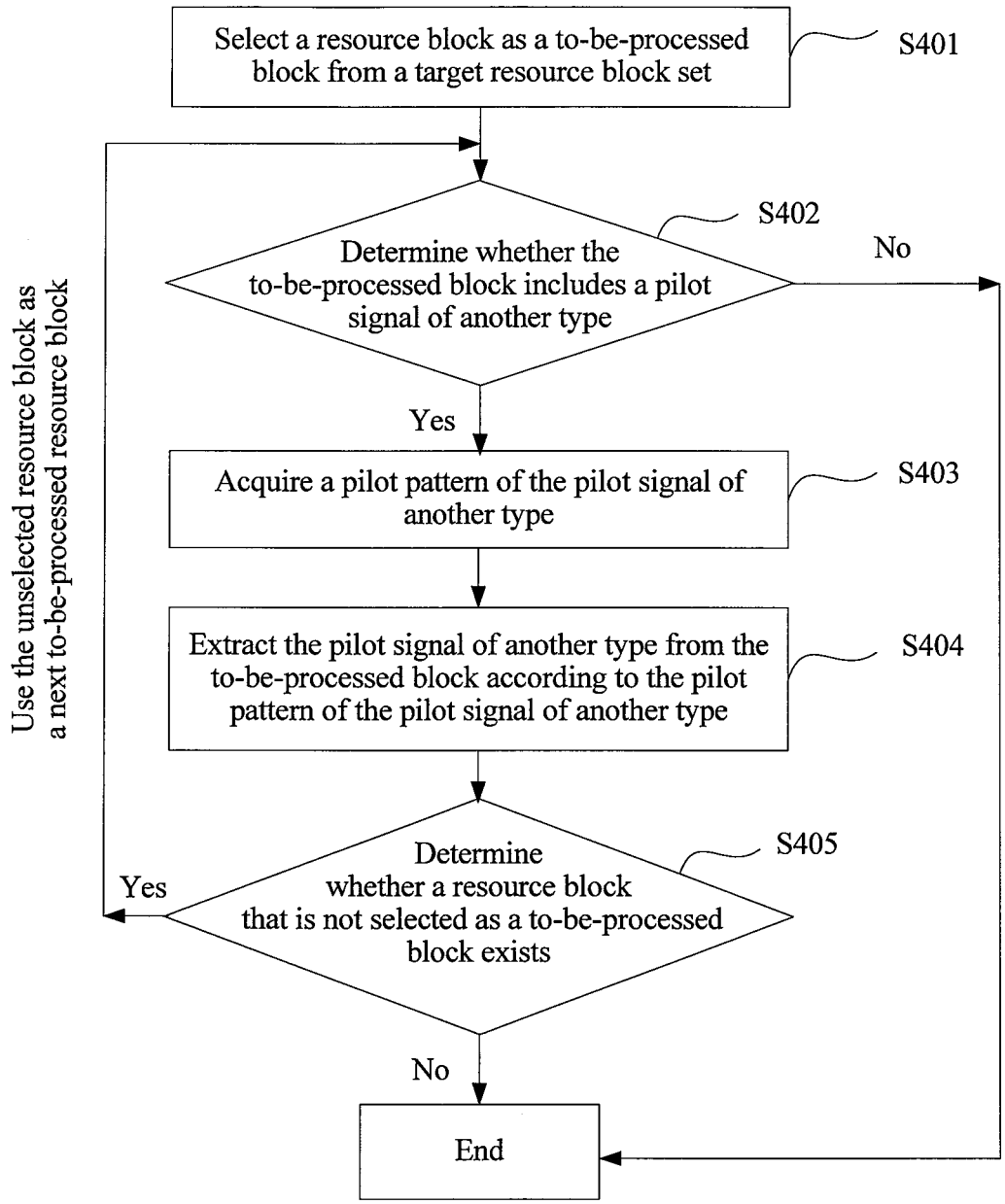
FIG. 10 is a schematic flowchart of another pilot signal receiving method according to an embodiment of this application.

As shown in FIG. 10, based on the embodiment shown in FIG. 8, the method may further include the following steps:

S401: Select a resource block as a to-be-processed block from the target resource block set.

S402: Determine whether the to-be-processed block includes a pilot signal of another type corresponding to the target carrier identifier; when a result of the determining is yes, perform S403. Otherwise, when a result of the determining is no, the procedure ends.

The pilot signal of another type includes one or a combination of a second type of pilot signal, a third type of pilot signal, and a fourth type of pilot signal, where the second type of pilot signal is used to control the terminal to perform channel estimation, the third type of pilot signal is used to control the terminal to perform channel state measurement and feedback, and the fourth type of pilot signal is used to control the terminal to perform location measurement.

S403: Acquire a pilot pattern of the pilot signal of another type according to a preset third correspondence between the pilot signal of another type and a pilot pattern.

S404: Extract the pilot signal of another type from the to-be-processed block according to the pilot pattern of the pilot signal of another type.

S405: Determine whether a resource block that is not selected as a to-be-processed block exists in all resource blocks in the target resource block set.

When the resource block that is not selected as a to-be-processed block exists, use the unselected resource block as a next to-be-processed resource block, and go back to S402. Otherwise, the procedure ends.

For the foregoing multiple method embodiments shown in FIG. 1 to FIG. 10, mutual reference may be made to same steps from the different method embodiments of a same subject, and different steps from the different method embodiments of a same subject can also be combined, where a technical solution obtained after the combination also falls within the protection scope of the embodiments of the present invention.

Based on the foregoing descriptions of the method embodiments, persons skilled in the art may clearly understand that this application may be implemented by software in addition to a necessary universal hardware platform or by hardware only. In most circumstances, the former is a preferred implementation manner. Based on such an understanding, the technical solutions of this invention essentially, or the part contributing to the prior art may be implemented in a form of a software product. The software product is stored in a storage medium, and includes several instructions for instructing a computer device (which may be a personal computer, a server, or a network device) to perform all or a part of the steps of the methods described in the embodiments of this application. The foregoing storage medium includes: any medium that can store program code, such as a read-only memory (ROM), a random access memory (RAM), a magnetic disk, or an optical disc.

An embodiment of the present invention further provides an apparatus and a device that are used to execute the foregoing method embodiments, which is described in the following by using examples.

Figure 11:
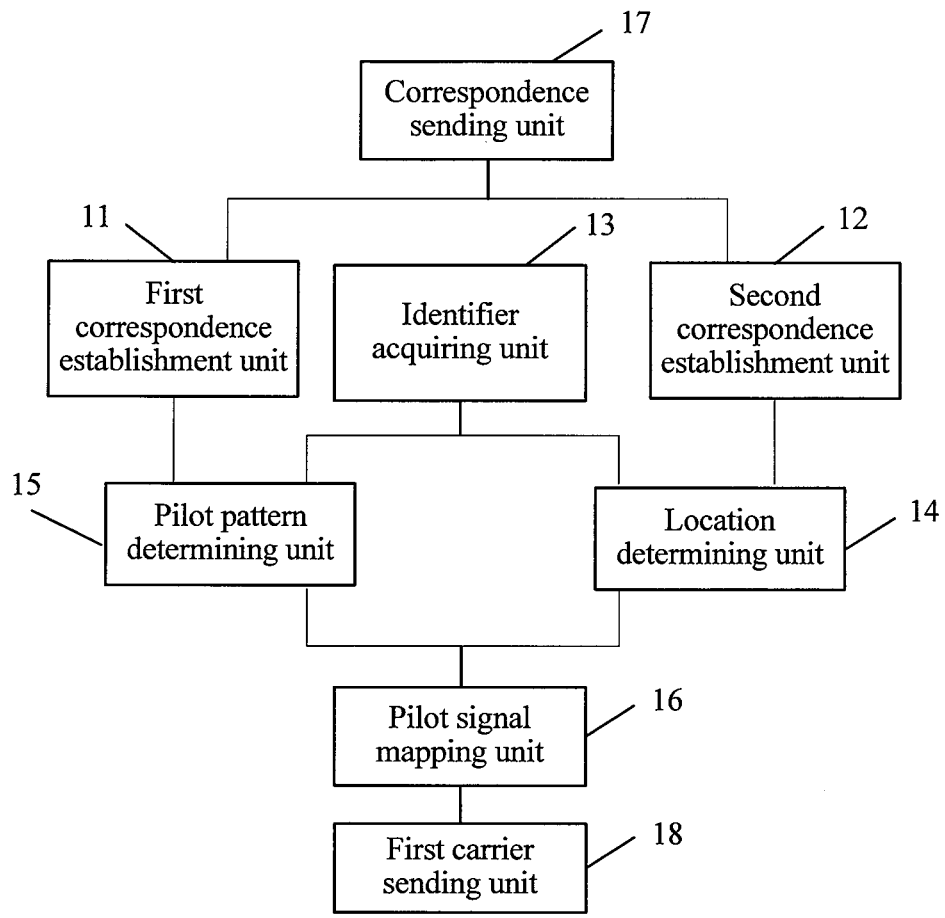
FIG. 11 is a schematic structural diagram of a pilot signal sending apparatus according to an embodiment of this application.

FIG. 11 is a schematic structural diagram of a pilot signal sending apparatus according to an embodiment of this application. As shown in FIG. 11, the apparatus includes:

a first correspondence establishment unit 11, configured to establish a first correspondence between a carrier identifier and a pilot pattern of a first type of pilot signal, where the first type of pilot signal is used to control a terminal to perform channel measurement;

a second correspondence establishment unit 12, configured to establish a second correspondence between a carrier identifier and a resource block set allocated in a carrier to the carrier identifier, where the resource block set includes multiple resource blocks that are continuous both in a time domain and in a frequency domain;

an identifier acquiring unit 13, configured to acquire a target carrier identifier of a target carrier;

a location determining unit 14, configured to determine, according to the second correspondence, a location of a target resource block set corresponding to the target carrier identifier;

a pilot pattern determining unit 15, configured to determine, according to the first correspondence, a target pilot pattern that is of a first type of pilot signal and that is corresponding to the target carrier identifier;

a pilot signal mapping unit 16, configured to map, according to the target pilot pattern, the first type of pilot signal corresponding to the target carrier identifier to each resource block in the target resource block set on the target carrier;

a correspondence sending unit 17, configured to send the first correspondence and the second correspondence to the terminal; and a first carrier sending unit 18, configured to send, to the terminal, the target carrier to which the first type of pilot signal is mapped.

Figure 12:
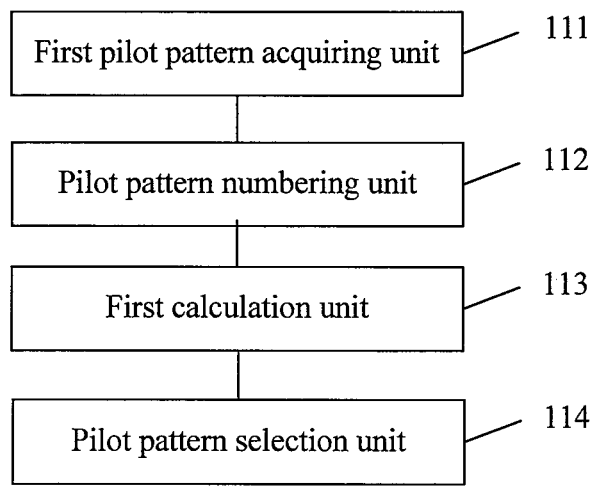
FIG. 12 is a schematic structural diagram of a first correspondence establishment unit according to an embodiment of this application.

As shown in FIG. 12, the first correspondence establishment unit 11 includes:

a first pilot pattern acquiring unit 111, configured to acquire multiple types of pilot patterns that are of the pilot signal and that are on a resource block, where the multiple types of pilot patterns are orthogonal in a pairwise manner;

a pilot pattern numbering unit 112, configured to perform numbering on the multiple types of pilot patterns, where different pilot patterns have different numbers;

a first calculation unit 113, configured to convert the carrier identifier into a decimal number, and divide the decimal number by a quantity of the multiple types of pilot patterns corresponding to the first type of pilot signal, so as to obtain a remainder; and a pilot pattern selection unit 114, configured to select, as the pilot pattern corresponding to the carrier identifier, a pilot pattern whose number is equal to the remainder.

Figure 13:
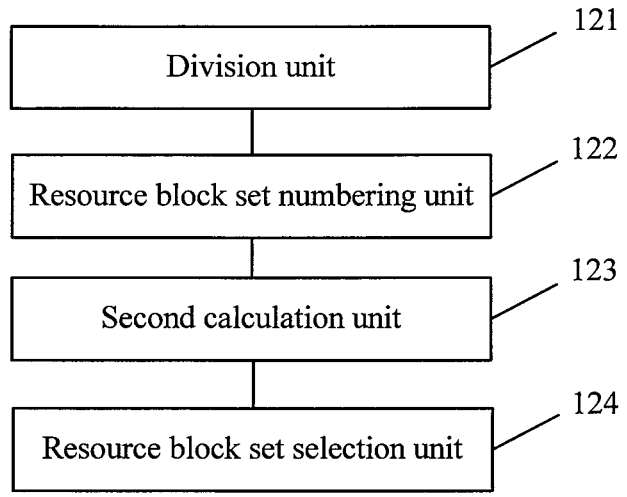
FIG. 13 is a schematic structural diagram of a second correspondence establishment unit according to an embodiment of this application.

As shown in FIG. 13, the second correspondence establishment unit 12 includes:

a division unit 121, configured to divide all resource blocks in the carrier into multiple resource block sets;

a resource block set numbering unit 122, configured to perform numbering on the multiple resource block sets, where different resource block sets have different numbers;

a second calculation unit 123, configured to convert the carrier identifier into a decimal number, and divide the decimal number by a quantity of the resource block sets obtained by means of division, so as to obtain a remainder; and a resource block set selection unit 124, configured to select, as the resource block set corresponding to the carrier identifier, a resource block set whose number is equal to the remainder.

The correspondence sending unit 17 may include:

a signaling generation unit, configured to generate radio resource control signaling that includes the first correspondence and the second correspondence; and a signaling sending unit, configured to send the radio resource control signaling to the terminal; and/or a second carrier generation unit, configured to generate a second carrier that includes the first correspondence and the second correspondence and that is adjacent to the target carrier; and a second carrier sending unit, configured to send the second carrier to the terminal.

Figure 14:
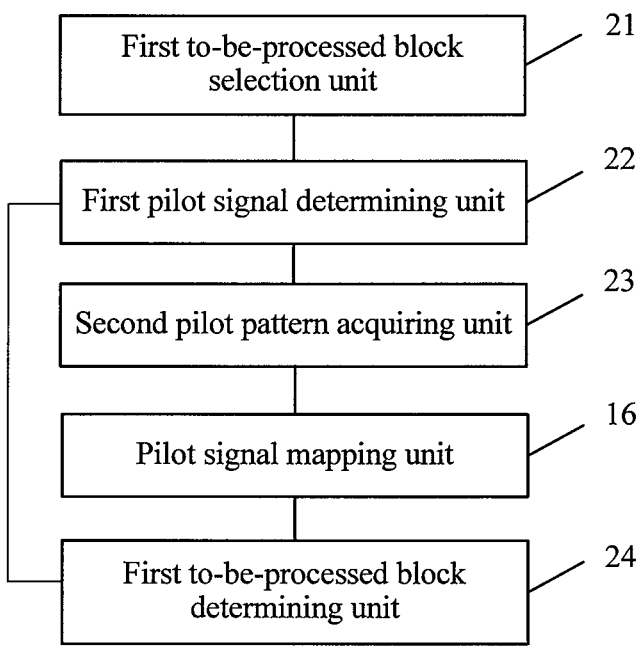
FIG. 14 is a schematic structural diagram of another pilot signal sending apparatus according to an embodiment of this application.

In addition, in another embodiment of this application, as shown in FIG. 14, the apparatus may further include:

a first to-be-processed block selection unit 21, configured to select a resource block as a to-be-processed block from the target resource block set;

a first pilot signal determining unit 22, configured to determine whether a pilot signal of another type is sent on the to-be-processed block, where the pilot signal of another type includes one or a combination of a second type of pilot signal, a third type of pilot signal, and a fourth type of pilot signal, the second type of pilot signal is used to control the terminal to perform channel estimation, the third type of pilot signal is used to control the terminal to perform channel state measurement and feedback, and the fourth type of pilot signal is used to control the terminal to perform location measurement;

a second pilot pattern acquiring unit 23, configured to: when the pilot signal of another type is sent on the to-be-processed, block, acquire a pilot pattern of the pilot signal of another type according to a preset third correspondence between the pilot signal of another type and a pilot pattern; where the pilot signal mapping unit 16 is further configured to map the pilot signal of another type to the to-be-processed block according to the pilot pattern of the pilot signal of another type; and a first to-be-processed block determining unit 24, configured to determine whether a resource block that is not selected as a to-be-processed block exists in all resource blocks in the target resource block set; and when the resource block that is not selected as a to-be-processed block exists, the first to-be-processed block selection unit 21 is further configured to use the unselected resource block as a next to-be-processed resource block, and the first pilot signal determining unit 22 is returned to continue to determine whether a pilot signal of another type is sent on the next to-be-processed block, until no resource block that is not selected as a to-be-processed block exists in the target resource block set.

Figure 15:
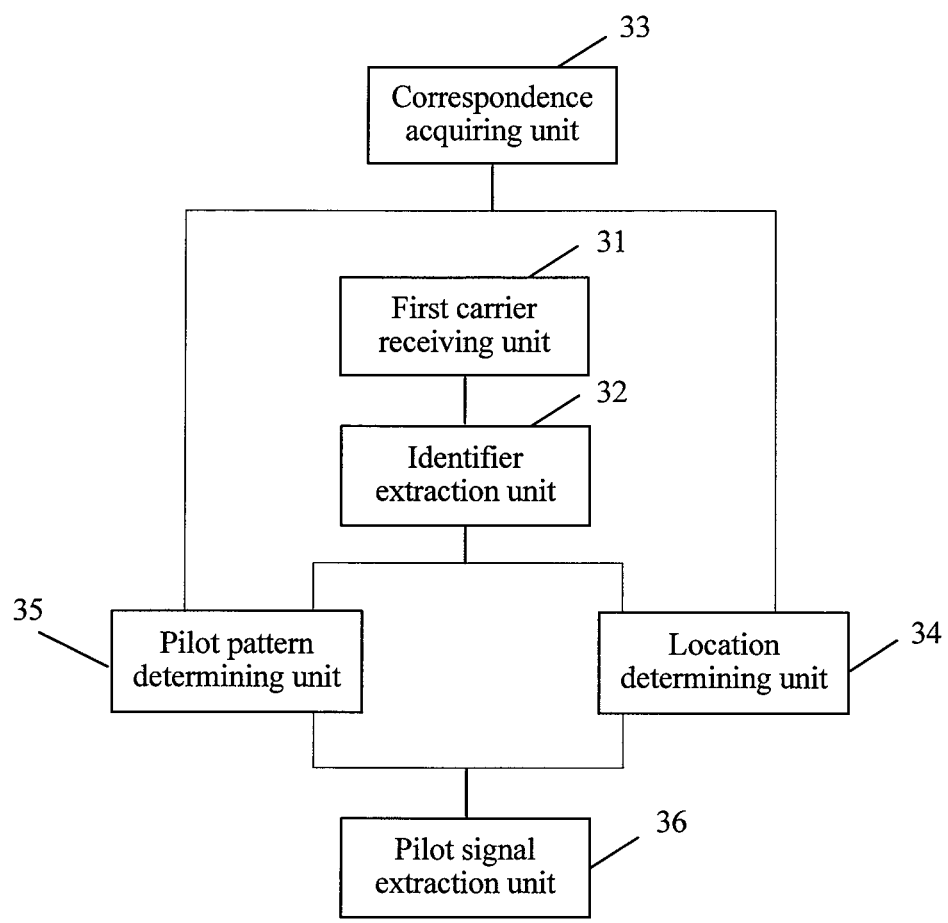
FIG. 15 is a schematic structural diagram of a pilot signal receiving apparatus according to an embodiment of this application.

FIG. 15 is a schematic structural diagram of a pilot signal receiving apparatus according to an embodiment of this application. As shown in FIG. 15, the apparatus includes:

a first carrier receiving unit 31, configured to receive a target carrier;

an identifier extraction unit 32, configured to extract a target carrier identifier from the target carrier;

a correspondence acquiring unit 33, configured to acquire a first correspondence between the target carrier identifier and a pilot pattern of a first type of pilot signal and a second correspondence between the target carrier identifier and a resource block set, where the first type of pilot signal is used to control a terminal to perform channel measurement, and the resource block set includes multiple resource blocks that are continuous both in a time domain and in a frequency domain;

a location determining unit 34, configured to determine, according to the second correspondence, a location of a target resource block set corresponding to the target carrier identifier;

a pilot pattern determining unit 35, configured to determine, according to the first correspondence, a target pilot pattern that is of a first type of pilot signal and that is corresponding to the target carrier identifier; and a pilot signal extraction unit 36, configured to extract, according to the target pilot pattern, the first type of pilot signal corresponding to the target carrier identifier from multiple resource blocks in the target resource block set on the target carrier.

The correspondence acquiring unit 33 may include:

a receiving unit, configured to receive radio resource control signaling or a second carrier adjacent to the target carrier, where the radio resource control signaling and the second carrier each carry the first correspondence between the target carrier identifier and the pilot pattern of the first type of pilot signal and the second correspondence between the target carrier identifier and the resource block set; and a correspondence extraction unit, configured to extract the first correspondence and the second correspondence from the radio resource control signaling or the second carrier.

Figure 16:
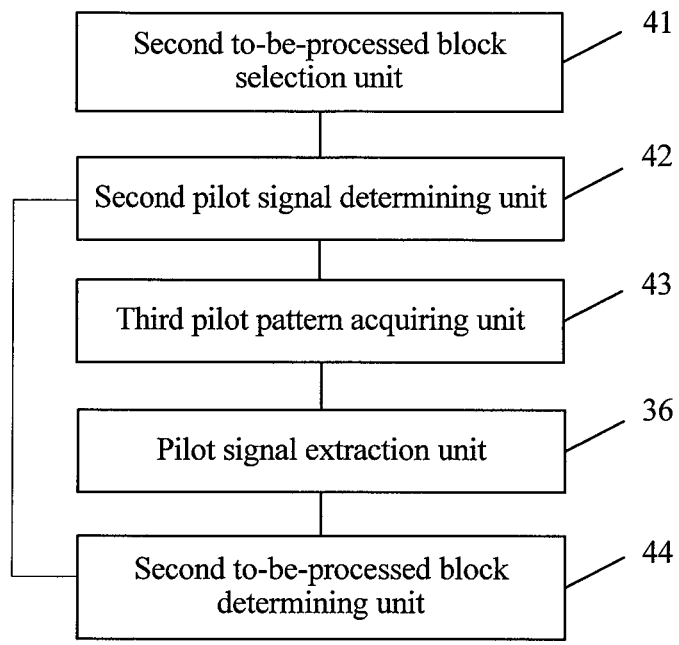
FIG. 16 is a schematic structural diagram of another pilot signal receiving apparatus according to an embodiment of this application.

As shown in FIG. 16, the apparatus may further include:

a second to-be-processed block selection unit 41, configured to select a resource block as a to-be-processed block from the target resource block set;

a second pilot signal determining unit 42, configured to determine whether the to-be-processed block includes a pilot signal of another type, where the pilot signal of another type includes one or a combination of a second type of pilot signal, a third type of pilot signal and a fourth type of pilot signal, the second type of pilot signal is used to control the terminal to perform channel estimation, the third type of pilot signal is used to control the terminal to perform channel state measurement and feedback, and the fourth type of pilot signal is used to control the terminal to perform location measurement;

a third pilot pattern acquiring unit 43, configured to: when the to-be-processed block includes the pilot signal of another type, acquire a pilot pattern of the pilot signal of another type according to a preset third correspondence between the pilot signal of another type and a pilot pattern; where the pilot signal extraction unit 36 is configured to extract the pilot signal of another type from the to-be-processed block according to the pilot pattern of the pilot signal of another type; and a second to-be-processed block determining unit 44, configured to determine whether a resource block that is not selected as a to-be-processed block exists in all resource blocks in the target resource block set; and when the resource block that is not selected as a to-be-processed block exists, the second to-be-processed block selection unit 41 is further configured to use the unselected resource block as a next to-be-processed resource block, and the second pilot signal determining unit 42 is returned to continue to determine whether a pilot signal of another type is sent on the next to-be-processed block, until no resource block that is not selected as a to-be-processed block in the target resource block set.

An embodiment of this application further provides a base station, where the base station may include: the pilot signal sending apparatus described in any embodiment shown in the foregoing FIG. 11 to FIG. 14.

Figure 17:
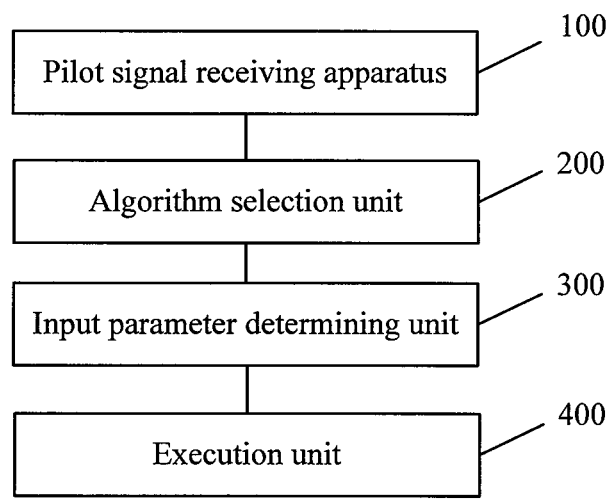
FIG. 17 is a schematic structural diagram of a terminal according to an embodiment of this application.

An embodiment of this application further provides a terminal, which, as shown in FIG. 17, may include: a pilot signal receiving apparatus 100, an algorithm selection unit 200, an input parameter determining unit 300, and an execution unit 400.

For detailed descriptions of the pilot signal receiving apparatus 100, reference may be made to foregoing detailed descriptions in any one of the embodiments shown in the FIG. 15 and FIG. 16. Details are not described herein again.

The algorithm selection unit 200 is configured to select a target algorithm corresponding to the target pilot pattern, where in this embodiment of this application, the target algorithm may include: a channel measurement algorithm, a channel estimation algorithm, a measurement and feedback algorithm for channel state information, another measurement algorithm, and the like.

The input parameter determining unit 300 is configured to use the extracted first type of pilot signal as an input parameter of the target algorithm.

The execution unit 400 is configured to execute a corresponding operation according to the target algorithm and the input parameter of the target algorithm.

Figure 18:
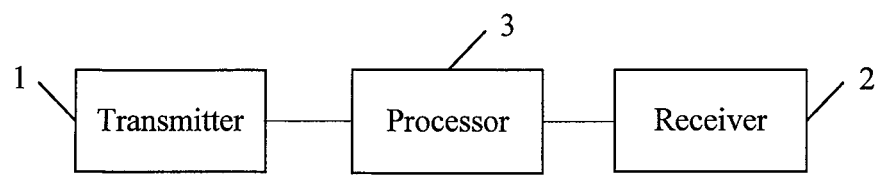
FIG. 18 is a schematic structural diagram of another terminal according to an embodiment of this application.

An embodiment of this application further provides a terminal, which, as shown in FIG. 18, may include: a transmitter 1, a receiver 2, and a processor 3.

The transmitter 1 is configured to send a message to a base station. The receiver 2 is configured to receive a carrier message or another message sent by the base station.

The processor 3 is configured to execute the following program:

receiving a target carrier; extracting a target carrier identifier from the target carrier; acquiring a first correspondence between the target carrier identifier and a pilot pattern of a first type of pilot signal and a second correspondence between the target carrier identifier and a resource block set, where the first type of pilot signal is used to control the terminal to perform channel measurement, and the resource block set includes multiple resource blocks that are continuous both in a time domain and in a frequency domain; determining, according to the second correspondence, a location of a target resource block set corresponding to the target carrier identifier; determining, according to the first correspondence, a target pilot pattern that is of a first type of pilot signal and that is corresponding to the target carrier identifier; and extracting, according to the target pilot pattern, the first type of pilot signal from multiple resource blocks in the target resource block set on the target carrier.

Figure 19:
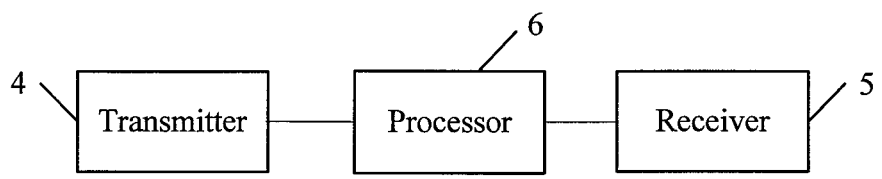
FIG. 19 is a schematic structural diagram of a base station according to an embodiment of this application.

An embodiment of this application further provides a base station, which, as shown in FIG. 19, may include: a transmitter 4, a receiver 5, and a processor 6.

The transmitter 4 is configured to send a carrier, a system message, resource control signaling, or the like to a terminal. The receiver 5 receives a message, such as channel measurement information, sent by the terminal. The transmitter 4 is configured to send a carrier message or another message such as control signaling to the terminal. The processor 6 is configured to execute the following program:

establishing a first correspondence between a carrier identifier and a pilot pattern of a first type of pilot signal, where the first type of pilot signal is used to control the terminal to perform channel measurement, and pilot patterns that are of the first type of pilot signal and that are corresponding to different carrier identifiers are orthogonal; establishing a second correspondence between a carrier identifier and a resource block set allocated in a carrier to the carrier identifier, where the resource block set includes multiple resource blocks that are continuous both in a time domain and in a frequency domain; acquiring a target carrier identifier of a target carrier; determining, according to the second correspondence, a location of a target resource block set corresponding to the target carrier identifier; determining, according to the first correspondence, a target pilot pattern that is of a first type of pilot signal and that is corresponding to the target carrier identifier; mapping, according to the target pilot pattern, the first type of pilot signal corresponding to the target carrier identifier to each resource block in the target resource block set on the target carrier; sending the first correspondence and the second correspondence to the terminal; and sending, to the terminal, the target carrier to which the first type of pilot signal is mapped.

Optionally, in this embodiment of this application, the processor 6 may further execute program corresponding to any one of the embodiment pilot signal sending methods in FIG. 1 to FIG. 7. In addition, with reference to the foregoing embodiments described in FIG. 11 to FIG. 14, steps executed by the correspondence sending unit 17 and the first carrier sending unit 18 are executed by the transmitter 4, and steps executed by another unit except the correspondence sending unit 17 and the first carrier sending unit 18 may be executed by the processor 6.

It may be understood that this application may be applicable to environments or configurations of many universal or dedicated computing systems, for example, a personal computer, a server computer, a handheld device or a portable device, a tablet-type device, a multi-processor system, a microprocessor-based system, a set-top box, a programmable consumer digital device, a network PC, a minicomputer, a mainframe computer, and a distributed computing environment including any one of the foregoing systems or devices.

This application can be described in the general context of executable computer instructions executed by a computer, for example, a program module. Generally, the program module includes a routine, program, object, component, data structure, and the like for executing a particular task or implementing a particular abstract data type. This application may be practiced in distributed computing environments in which tasks are performed by remote processing devices that are connected through a communications network. In a distributed computing environment, program modules may be located in both local and remote computer storage media including storage devices.

It should be noted that in this specification, relational terms such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely specific implementation manners of this application. It should be noted that persons of ordinary skill in the art may make several improvements or polishing without departing from the principle of this application and the improvements or polishing shall fall within the protection scope of this application.

What is claimed is:

1. A pilot signal sending method, comprising:
establishing a first correspondence between a carrier identifier and a first pilot pattern of a first type of pilot signal, the first type of pilot signal for controlling a terminal to perform channel measurement, and first pilot patterns of the first type of pilot signal that correspond to different carrier identifiers are orthogonal;
establishing a second correspondence between a carrier identifier and a resource block set allocated in a carrier to the carrier identifier, wherein the resource block set comprises multiple resource blocks that are continuous both in a time domain and in a frequency domain;
acquiring a target carrier identifier of a target carrier;
determining, according to the second correspondence, a location of a target resource block set corresponding to the target carrier identifier;
determining, according to the first correspondence, a target first pilot pattern of a first type of pilot signal that corresponds to the target carrier identifier;
mapping, according to the target first pilot pattern, the first type of pilot signal corresponding to the target carrier identifier to each resource block in the target resource block set on the target carrier;
sending the first correspondence and the second correspondence to the terminal; and
sending, to the terminal, the target carrier to which the first type of pilot signal is mapped.

2. The method according to claim 1, wherein establishing a first correspondence between a carrier identifier and a first pilot pattern of a first type of pilot signal comprises:
acquiring multiple types of first pilot patterns of the first type of pilot signal that are on a resource block, wherein the multiple types of first pilot patterns are orthogonal in a pairwise manner;
performing numbering on the multiple types of first pilot patterns, wherein different first pilot patterns have different numbers;
converting the carrier identifier into a decimal number, and dividing the decimal number by a quantity of the multiple types of first pilot patterns corresponding to the first type of pilot signal, to obtain a remainder; and
selecting, as the pilot pattern corresponding to the carrier identifier, a pilot pattern whose number is equal to the remainder.

3. The method according to claim 1, wherein establishing a second correspondence between a carrier identifier and a resource block set allocated in a carrier to the carrier identifier comprises:
dividing all resource blocks in the carrier into multiple resource block sets;
performing numbering on the multiple resource block sets, wherein different resource block sets have different numbers;
converting the carrier identifier into a decimal number, and dividing the decimal number by a quantity of the resource block sets obtained through division to obtain a remainder; and
selecting, as the resource block set corresponding to the carrier identifier, a resource block set whose number is equal to the remainder.

4. The method according to claim 1, wherein sending the first correspondence and the second correspondence to the terminal comprises:
generating radio resource control signaling comprising the first correspondence and the second correspondence, and sending the radio resource control signaling to the terminal; and/or
generating a second carrier comprising the first correspondence and the second correspondence that is adjacent to the target carrier, and sending the second carrier to the terminal.

5. The method according to claim 1, wherein the method further comprises:
selecting a resource block as a to-be-processed block from the target resource block set;
determining whether a pilot signal of another type corresponding to the target carrier identifier is sent on the to-be-processed block, wherein the pilot signal of another type comprises one or a combination of a second type of pilot signal, a third type of pilot signal, and a fourth type of pilot signal, the second type of pilot signal for controlling the terminal to perform channel estimation, the third type of pilot signal for controlling the terminal to perform channel state measurement and feedback, and the fourth type of pilot signal for controlling the terminal to perform location measurement;
when the pilot signal of another type is sent on the to-be-processed block, acquiring a second pilot pattern of the pilot signal of another type according to a preset third correspondence between the pilot signal of another type and a pilot pattern;
mapping the pilot signal of another type to the to-be-processed block according to the second pilot pattern of the pilot signal of another type;
determining whether a resource block that is not selected as a to-be-processed block exists in all resource blocks in the target resource block set; and
when the resource block that is not selected as a to-be-processed block exists, using the unselected resource block as a next to-be-processed resource block, and determining whether a pilot signal of another type corresponding to the target carrier identifier is sent on the next to-be-processed block, until no resource block that is not selected as a to-be-processed block exists in the target resource block set.

6. A pilot signal receiving method, comprising:
receiving a target carrier;
extracting a target carrier identifier from the target carrier;
acquiring a first correspondence between the target carrier identifier and a first pilot pattern of a first type of pilot signal and a second correspondence between the target carrier identifier and a resource block set, the first type of pilot signal for controlling a terminal to perform channel measurement, and the resource block set comprises multiple resource blocks that are continuous both in a time domain and in a frequency domain;
determining, according to the second correspondence, a location of a target resource block set corresponding to the target carrier identifier;
determining, according to the first correspondence, a target first pilot pattern of a first type of pilot signal that corresponds to the target carrier identifier; and
extracting, according to the target first pilot pattern, the first type of pilot signal corresponding to the target carrier identifier from multiple resource blocks in the target resource block set on the target carrier.

7. The method according to claim 6, wherein acquiring a first correspondence between the target carrier identifier and a first pilot pattern of a first type of pilot signal and a second correspondence between the target carrier identifier and a resource block set comprises:
receiving radio resource control signaling, or receiving a second carrier adjacent to the target carrier, wherein the radio resource control signaling and the second carrier each carry the first correspondence between the target carrier identifier and the first pilot pattern of the first type of pilot signal and the second correspondence between the target carrier identifier and the resource block set; and
extracting the first correspondence and the second correspondence from the radio resource control signaling or the second carrier.

8. The method according to claim 6, further comprising:
selecting a resource block as a to-be-processed block from the target resource block set;
determining whether the to-be-processed block comprises a pilot signal of another type corresponding to the target carrier identifier, wherein the pilot signal of another type comprises one or a combination of a second type of pilot signal, a third type of pilot signal, and a fourth type of pilot signal, the second type of pilot signal for controlling the terminal to perform channel estimation, the third type of pilot signal for controlling the terminal to perform channel state measurement and feedback, and the fourth type of pilot signal for controlling the terminal to perform location measurement;
when the to-be-processed block comprises the pilot signal of another type, acquiring a second pilot pattern of the pilot signal of another type according to a preset third correspondence between the pilot signal of another type and a pilot pattern;

extracting the pilot signal of another type from the to-be-processed block according to the second pilot pattern of the pilot signal of another type;

determining whether a resource block that is not selected as a to-be-processed block exists in all resource blocks in the target resource block set; and when the resource block that is not selected as a to-be-processed block exists, using the unselected resource block as a next to-be-processed resource block, and determining whether a pilot signal of another type corresponding to the target carrier identifier is sent on the next to-be-processed block, until no resource block that is not selected as a to-be-processed block exists in the target resource block set.

9. A pilot signal sending apparatus, comprising:
processor configured to:
  establish a first correspondence between a carrier identifier and a first pilot pattern of a first type of pilot signal, the first type of pilot signal for controlling a terminal to perform channel measurement,
  establish a second correspondence between a carrier identifier and a resource block set allocated in a carrier to the carrier identifier, wherein the resource block set comprises multiple resource blocks that are continuous both in a time domain and in a frequency domain,
  acquire a target carrier identifier of a target carrier,
  determine, according to the second correspondence, a location of a target resource block set corresponding to the target carrier identifier,
  determine, according to the first correspondence, a target first pilot pattern of a first type of pilot signal that corresponds to the target carrier identifier, and
  map, according to the target first pilot pattern, the first type of pilot signal corresponding to the target carrier identifier to each resource block in the target resource block set on the target carrier; and
a transmitter configured to:
  send the first correspondence and the second correspondence to the terminal, and
  send, to the terminal, the target carrier to which the first type of pilot signal is mapped.

10. The apparatus according to claim 9, wherein the processor is configured to:
  acquire multiple types of first pilot patterns of the first type of pilot signal that are on a resource block, wherein the multiple types of first pilot patterns are orthogonal in a pairwise mariner;
  perform numbering on the multiple types of first pilot patterns, wherein different first pilot patterns have different numbers;
  convert the carrier identifier into a decimal number, and divide the decimal number by a quantity of the multiple types of first pilot patterns corresponding to the first type of pilot signal, to obtain a remainder; and
  select, as the pilot pattern corresponding to the carrier identifier, a pilot pattern whose number is equal to the remainder.

11. The apparatus according to claim 9, wherein the processor is configured to:
  divide all resource blocks in the carrier into multiple resource block sets;
  perform numbering on the multiple resource block sets, wherein different resource block sets have different numbers;
  convert the carrier identifier into a decimal number, and divide the decimal number by a quantity of the resource block sets obtained through division to obtain a remainder; and
  select, as the resource block set corresponding to the carrier identifier, a resource block set whose number is equal to the remainder.

12. The apparatus according to claim 9, wherein the processor is configured to:
  generate radio resource control signaling that comprises the first correspondence and the second correspondence; and
  send the radio resource control signaling to the terminal; and/or
  generate a second carrier comprises the first correspondence and the second correspondence that is adjacent to the target carrier; and
  send the second carrier to the terminal.

13. The apparatus according to claim 9, wherein the processor is further configured to:
  select a resource block as a to-be-processed block from the target resource block set;
  determine whether a pilot signal of another type corresponding to the target carrier identifier is sent on the to-be-processed block, wherein the pilot signal of another type comprises one or a combination of a second type of pilot signal, a third type of pilot signal, and a fourth type of pilot signal, the second type of pilot signal for controlling the terminal to perform channel estimation, the third type of pilot signal for controlling the terminal to perform channel state measurement and feedback, and the fourth type of pilot signal for controlling the terminal to perform location measurement;
  when the pilot signal of another type is sent on the to-be-processed block, acquire a second pilot pattern of the pilot signal of another type according to a preset third correspondence between the pilot signal of another type and a pilot pattern;
  map the pilot signal of another type to the to-be-processed block according to the second pilot pattern of the pilot signal of another type;
  determine whether a resource block that is not selected as a to-be-processed block exists in all resource blocks in the target resource block set; and
  when the resource block that is not selected as a to-be-processed block exists, use the unselected resource block as a next to-be-processed resource block, and determine whether a pilot signal of another type corresponding to the target carrier identifier is sent on the next to-be-processed block, until no resource block that is not selected as a to-be-processed block exists in the target resource block set.

14. A pilot signal receiving apparatus, comprising:
a receiver configured to: receive a target carrier; and
a processor configured to:
  extract a target carrier identifier from the target carrier,
  acquire a first correspondence between the target carrier identifier and a first pilot pattern of a first type of pilot signal and a second correspondence between the target carrier identifier and a resource block set, the first type of pilot signal for controlling a terminal to perform channel measurement, and the resource block set comprises multiple resource blocks that are continuous both in a time domain and in a frequency domain, determine, according to the second correspondence, a location of a target resource block set corresponding to the target carrier identifier, determine, according to the first correspondence, a target first pilot pattern of a first type of pilot signal that corresponds to the target carrier identifier, and extract, according to the target first pilot pattern, the first type of pilot signal corresponding to the target carrier identifier from multiple resource blocks in the target resource block set on the target carrier.

15. The apparatus according to claim 14, wherein:

the receiver is configured to:

receive radio resource control signaling, or receive a second carrier adjacent to the target carrier, wherein the radio resource control signaling and the second carrier each carry the first correspondence between the target carrier identifier and the first pilot pattern of the first type of pilot signal and the second correspondence between the target carrier identifier and the resource block set; and the processor is configured to:

extract the first correspondence and the second correspondence from the radio resource control signaling or the second carrier.

16. The apparatus according to claim 14, wherein the processor is configured to:

select a resource block as a to-be-processed block from the target resource block set;

determine whether the to-be-processed block comprises a pilot signal of another type corresponding to the target carrier identifier, wherein the pilot signal of another type comprises one or a combination of a second type of pilot signal, a third type of pilot signal, and a fourth type of pilot signal, the second type of pilot signal for controlling the terminal to perform channel estimation, the third type of pilot signal for controlling the terminal to perform channel state measurement and feedback, and the fourth type of pilot signal for controlling the terminal to perform location measurement;

when the to-be-processed block comprises the pilot signal of another type, acquire a second pilot pattern of the pilot signal of another type according to a preset third correspondence between the pilot signal of another type and a pilot pattern;

extract the pilot signal of another type from the to-be-processed block according to the second pilot pattern of the pilot signal of another type;

determine whether a resource block that is not selected as a to-be-processed block exists in all resource blocks in the target resource block set; and when the resource block that is not selected as a to-be-processed block exists, use the unselected resource block as a next to-be-processed resource block, and determine whether a pilot signal of another type corresponding to the target carrier identifier is sent on the next to-be-processed block, until no resource block that is not selected as a to-be-processed block exists in the target resource block set.

* * * * *